(12) United States Patent
Fuwa (10) Patent No.: US 6,463,912 B1
(45) Date of Patent: Oct. 15, 2002

(54) INTAKE AIR VOLUME DETECTION DEVICE FOR INTERNAL COMBUSTION ENGINE

(75) Inventor: Naohide Fuwa, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/673,868

(22) PCT Filed: Apr. 22, 1999

(86) PCT No.: PCT/JP99/02158

§ 371 (c)(1),
(2), (4) Date: Oct. 20, 2000

(87) PCT Pub. No.: WO99/54614

PCT Pub. Date: Oct. 28, 1999

(30) Foreign Application Priority Data

Apr. 22, 1998 (JP) .......................................... 10-111919

(51) Int. Cl.⁷ ............................................. F02D 41/04
(52) U.S. Cl. ...................... 123/480; 123/478; 123/703
(58) Field of Search .................. 123/478, 480, 123/90.15, 681, 687, 703, 399; 701/102, 108; 73/117.3

(56) References Cited

U.S. PATENT DOCUMENTS

| | | | | |
|---|---|---|---|---|
| 5,540,091 A | * | 7/1996 | Nakagawa | 73/117.3 |
| 5,546,907 A | | 8/1996 | Komoriya et al. | 123/478 |
| 5,758,621 A | * | 6/1998 | Suzuki et al. | 123/399 |
| 6,196,197 B1 | * | 3/2001 | Yamada et al. | 123/480 |
| 6,227,182 B1 | * | 5/2001 | Muraki et al. | 701/108 |

FOREIGN PATENT DOCUMENTS

| | | | | |
|---|---|---|---|---|
| JP | 60-56113 | * | 4/1985 | F02D/13/02 |
| JP | 63-36038 | | 2/1988 | |
| JP | 1-151716 | * | 6/1989 | F02B/27/02 |
| JP | 4-143432 | | 5/1992 | |
| JP | 6-01747 | | 1/1994 | |
| JP | 7-269708 | | 10/1995 | |
| JP | 8-42370 | | 2/1996 | |
| JP | 9-287487 | | 11/1997 | |
| JP | 3-260357 | | 11/1999 | |

* cited by examiner

*Primary Examiner*—John Kwon
*Assistant Examiner*—Hieu T. Vo
(74) *Attorney, Agent, or Firm*—Kenyon & Kenyon (57) ABSTRACT

An apparatus for accurately detecting the amount of engine intake air based on the amount of air flowing past an air flow meter in an internal combustion engine equipped with a variable intake air control mechanism capable of varying the operating condition of an intake air control valve that controls the flow of intake air into a combustion engine. A smoothing factor is computed in such a manner that the smoothing factor is reduced to increase the degree of smoothing when volumetric efficiency decreases depending on the operating condition of the intake air control valve. The amount of engine intake air is computed by smoothing the flow rate of air measured by the air flow meter, based on the smoothing factor. Further, volumetric efficiency is computed based on engine load and engine speed as well as on the operating condition of the intake air control valve, and the smoothing factor is calculated based on the thus computed volumetric efficiency.

6 Claims, 11 Drawing Sheets

INTAKE AIR VOLUME DETECTION DEVICE FOR INTERNAL COMBUSTION ENGINE

TECHNICAL FIELD

The present invention relates to an apparatus for detecting the amount of intake air in an internal combustion engine equipped with a variable intake air control mechanism capable of varying the operating condition of an intake air control valve that controls the flow of intake air into a combustion chamber.

BACKGROUND ART

In an internal combustion engine, the amount of intake air to the engine must be detected in order to determine the amount of fuel to be injected. Known methods of detection include the mass flow method and the speed density method. The mass flow method directly measures the amount of air flowing through an intake passage by using an air flow meter. However, when the engine is in a transient condition, the amount of air measured by the air flow meter does not accurately represents the amount of intake air flowing into the engine.

That is, in an accelerating condition in which the throttle valve is being opened from its closed position, not only the amount of air filled into the combustion chamber, but the amount of air filled into the intake passage from the throttle valve to the combustion chamber is also measured; on the other hand, in a decelerating condition in which the throttle valve is being closed from an open position, the fuel filled into the intake passage from the throttle valve to the combustion chamber, and to be introduced into the combustion chamber, is not measured. To correct the measured value of the air flow meter in a transient condition to represent the actual amount of intake air flowing into the engine, processing called "smoothing" is performed to smooth the measure value of the air flow meter (refer, for example, to Japanese Unexamined Pat. No. 63-36038). In this processing, a smoothing factor predetermined according to the type of engine is usually used.

In recent years, a variety of variable valve mechanisms have been developed and commercially implemented to achieve optimum valve characteristics according to varying driving conditions. The valve characteristics include valve timing, valve open period (cam operating period), valve lift amount (cam lift amount), etc. Various types of variable valve systems have been devised and include: one that varies the center time of the valve open period while maintaining the valve open period constant in length, by varying the phase of camshaft rotation (the camshaft phase) relative to the crankshaft either continuously or in two steps (ON/OFF control); one that varies the valve open period and valve lift amount in steps while keeping the center time of the valve open period fixed, by using a plurality of cams having different profiles and by switching between them in operation; and one that employs a three-dimensional cam whose profile changes in the axial direction of the camshaft, and that varies the valve open period and valve lift amount continuously by moving the camshaft along the axial direction, while keeping the center time of the valve open period fixed.

In an engine equipped with such a variable valve mechanism, however, the volumetric efficiency (the pumping performance of the engine, expressed as the ratio of the volume of fresh intake air, converted to a value represented by inlet temperature and pressure, to the cylinder capacity) varies during the operation of the mechanism; therefore, with the smoothing process using a fixed smoothing factor, the amount of engine intake air cannot be calculated accurately. This poses a barrier to improving the accuracy of air-fuel ratio control.

Other types of commercially implemented internal combustion engines include one that enhances the intake inertia effect by varying the area or length of the intake passage by means of a control valve installed in the intake passage, and one that enhances combustion efficiency by causing a swirl of a mixture in the intake port around the intake valve by means of a swirl control valve, and by introducing the swirling mixture directly into the combustion chamber. In internal combustion engines that change the intake air flow (flow rate and flow direction) using such a control valve or a swirl control valve, since the volumetric efficiency varies according to the valve operating condition, such engines also have the same problem as that of the internal combustion engines equipped with variable valve mechanisms.

The intake and exhaust valves associated with the variable valve mechanism, the control valve used to vary the area or length of the intake air passage, the swirl control valve, etc. can all be considered as intake air control valves that control the flow of intake air into the combustion chamber.

DISCLOSURE OF THE INVENTION

In view of the above situation, it is an object of the present invention to further improve the accuracy of air-fuel ratio control and, hence, to contribute to the prevention of air pollution, by providing an intake air amount detection apparatus capable of accurately measuring the amount of engine intake air based on the amount of flowing air measured by an air flow meter in an internal combustion engine equipped with an intake air control valve that controls the flow of intake air into the combustion chamber.

To achieve the above object, according to the present invention, there is provided an apparatus for detecting the amount of intake air in an internal combustion engine having an intake passage, a throttle valve installed in the intake passage for controlling the amount of intake air, and a variable intake air control mechanism capable of varying the operating condition of an intake air control valve that controls the flow of intake air into a combustion chamber, the intake air amount detection apparatus comprising: flowing air amount measuring means for measuring the flow rate of air flowing through the intake passage; intake air control valve operating condition detecting means for detecting the operating condition of the intake air control valve; smoothing factor computing means for computing a smoothing factor in such a manner that the smoothing factor is reduced to increase the degree of smoothing when volumetric efficiency decreases depending on the operating condition of the intake air control valve detected by the intake air control valve operating condition detecting means; and intake air amount computing means for computing the amount of engine intake air by smoothing the flow rate measured by the flowing air amount measuring means based on the smoothing factor computed by the smoothing factor computing means.

Preferably, according to the present invention, the smoothing factor computing means computes the volumetric efficiency based not only on the operating condition of the intake air control valve but also on engine load and engine speed, and computes the smoothing factor based on the thus computed volumetric efficiency.

Preferably, according to the present invention, the variable intake air control mechanism is a variable valve mechanism that utilizes an intake valve or an exhaust valve as the intake air control valve and varies the open condition of the valve.

Preferably, according to the present invention, the variable valve mechanism varies intake valve timing by continuously varying the phase of rotation of an intake camshaft relative to a crankshaft within a predetermined angle range.

Preferably, according to the present invention, the variable valve mechanism is a cam switching type mechanism which switches operation between a plurality of cams having different valve opening characteristics.

In the thus constructed intake air amount detection apparatus for an internal combustion engine according to the present invention, since the amount of engine intake air is computed by smoothing the measured value of the flow rate of air flowing through the intake passage in the engine by using the smoothing factor determined in accordance with the operating condition of the intake air control valve, the amount of intake air can be detected with higher accuracy.

BEST MODE FOR CARRYING OUT THE INVENTION

Embodiments of the present invention will be described below with reference to the accompanying drawings.

Figure 1:
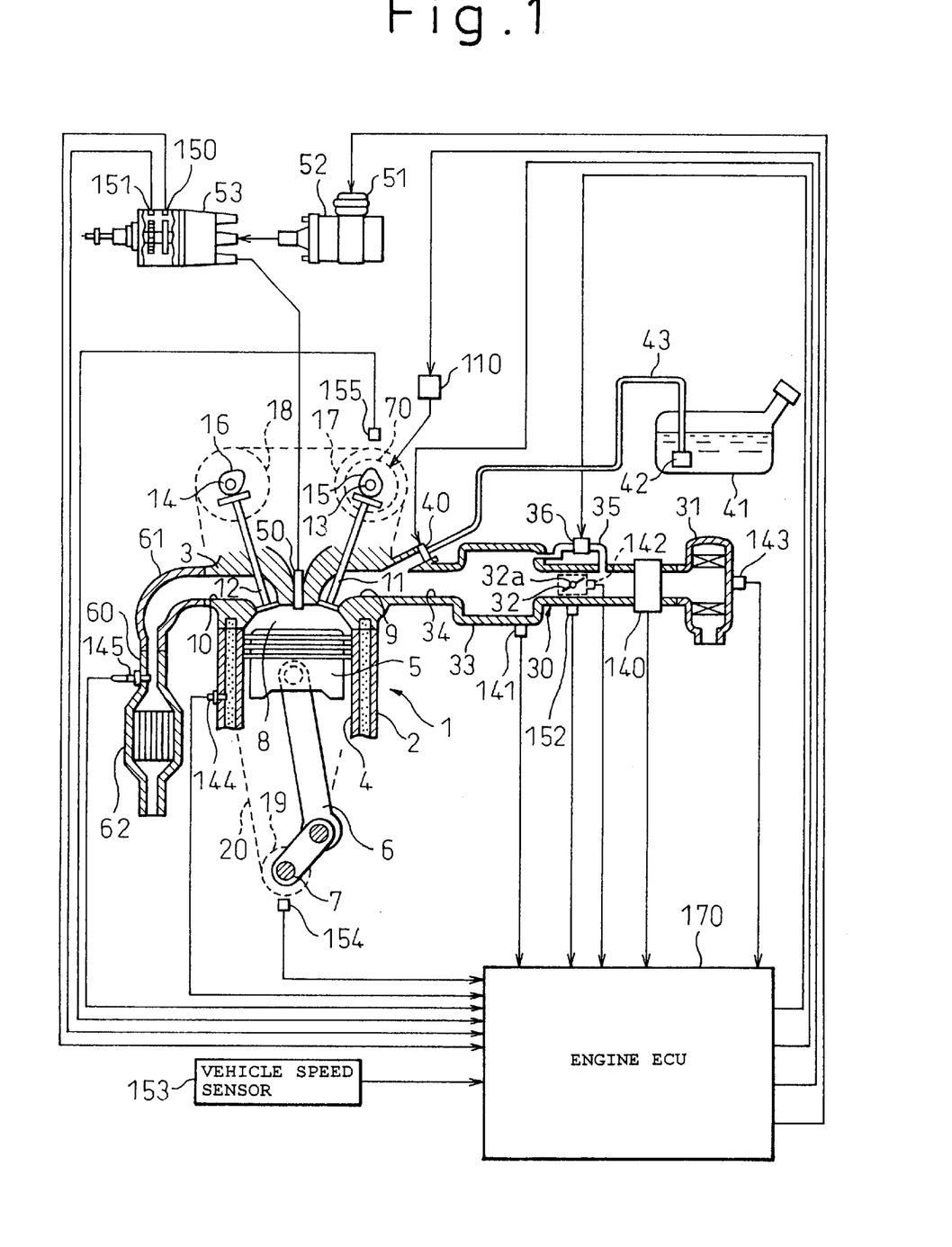
FIG. 1 is a schematic diagram showing the general construction of an electronically controlled internal combustion engine equipped with an intake air amount detection apparatus according to one embodiment of the present invention.

FIG. 1 is a schematic diagram showing the general construction of an electronically controlled internal combustion engine equipped with an intake air amount detection apparatus according to one embodiment of the present invention. The internal combustion engine 1 is an in-line multi-cylinder, four-stroke/cycle, reciprocating gasoline engine mounted in a vehicle. The engine 1 comprises a cylinder block 2 and a cylinder head 3. In the cylinder block 2 are bored a plurality of vertically extending cylinders 4 that are arranged side by side in the direction perpendicular to the plane of the figure, and a piston 5 is mounted movably, in a reciprocating fashion, inside each cylinder 4. Each piston 5 is connected to a common crankshaft 7 by means of a connecting rod 6. The reciprocating motion of the piston 5 is converted to the rotational motion of the crankshaft 7 by means of the connecting rod 6.

Between the cylinder block 2 and cylinder head 3 are formed combustion chambers 8, one each located above each piston 5. The cylinder head 3 contains an intake port 9 and exhaust port 10 for each combustion chamber 8 which communicates with both exterior sides of the cylinder head 3 through these ports 9 and 10. To open and close these ports 9 and 10, an intake valve 11 and an exhaust valve 12 are supported in the cylinder head 3 in such a manner as to be movable in reciprocating fashion in substantially vertical directions. In the cylinder head 3, an intake camshaft 13 and an exhaust camshaft 14 are rotatably mounted above the respective valves 11 and 12. The camshafts 13 and 14 are fitted with cams 15 and 16 for driving the intake valve 11 and exhaust valve 12, respectively. Timing pulleys 17 and 18 provided at respective ends of the camshafts 13 and 14 are connected by means of a timing belt 20 to a timing pulley 19 provided at one end of the crankshaft 7.

More specifically, as the crankshaft 7 rotates causing the timing pulley 19 to rotate, the rotational motion is transmitted to the timing pulleys 17 and 18 by means of the timing belt 20. At this time, the timing pulleys 17 and 18 are caused to rotate at the rotational speed one half that of the timing pulley 19. When the intake camshaft 13 rotates with the rotation of the timing pulley 17, the intake valve 11 moves in reciprocating fashion by the action of the cam 15, to open and close the intake port 9. Likewise, when the exhaust camshaft 14 rotates with the rotation of the timing pulley 18, the exhaust valve 12 is moved, in reciprocating fashion by the action of the cam 16, to open and close the exhaust port 10. In this way, the camshafts 13 and 14 are driven for rotation by the rotation of the crankshaft 7, to open and close the intake valve 11 and exhaust valve 12 in a constant cycle of 720 degrees of crankshaft rotation.

An intake passage 30 provided with an air cleaner 31, throttle valve 32, surge tank 33, intake manifold 34, etc. is connected to the intake port 9. Air (fresh air) drawn from outside the engine 1 passes through the parts 31, 32, 33, and 34 of the intake passage 30 in the order named and flows toward the combustion chamber 8. The throttle valve 32 is rotatably mounted on a shaft 32a in the intake passage 30. The shaft 32a is connected via a wire or the like to an accelerator pedal (not shown) in the driver compartment, and is rotated, in an integral fashion, with the throttle valve 32 when the driver depresses the accelerator pedal. At this time, the amount of air flowing through the intake passage 30 (the amount of intake air) is determined according to the angular position of the throttle valve 32. The surge tank 33 is provided to smooth out intake air pulsation (pressure vibration). An idle speed control valve (ISCV) 36 for adjusting air flow rate during idling is installed in an idle adjust passage 35 that bypasses the throttle valve 32.

An injector 40 for injecting fuel into the intake port 9 is mounted in the intake manifold 34. Fuel stored in a fuel tank 41 is drawn by a fuel pump 42 and supplied to the injector 40 through a fuel pipe 43. The fuel injected from the injector 40 and the air flowing through the intake passage 30 are mixed together, and the air-fuel mixture is drawn through the intake valve 11 into the combustion chamber 8 during the intake stroke and compressed by the piston 5 during the compression stroke.

A spark plug 50 is mounted in the cylinder head 3 to ignite the mixture. To accomplish the ignition, an ignition signal is applied to an igniter 51, which controls the switching of the primary current in an ignition coil 52, and the induced secondary current is supplied to the spark plug 50 by an ignition distributor 53. The ignition distributor 53 is driven by a camshaft, and distributes the secondary current to the spark plug 50 on each cylinder in synchronism with the rotation of the crankshaft 7. The mixture drawn into the combustion chamber 8 is burned by being ignited by the spark plug 50 (expansion stroke). The resulting high-temperature, high-pressure burning gases force the piston 5 downward, causing the crankshaft 7 to rotate, and the engine 1 thus produces power.

The burned mixture, as an exhaust gas, is introduced through the exhaust valve 12 into the exhaust port 10 during the exhaust stroke. An exhaust passage 60 provided with an exhaust manifold 61, catalytic converter 62, etc. is connected to the exhaust port 10. The catalytic converter 62 contains a three-way catalyst which simultaneously promotes the oxidation of unburned hydrocarbons (HC) and carbon monoxide (CO) and the reduction of nitrogen oxides (NOx) formed by unburned oxygen reacting with nitrogen in the air. The exhaust gas thus purified in the catalytic converter 62 is discharged into the atmosphere.

In this engine 1, as a variable valve mechanism a generally known continuously variable valve timing mechanism (VVT mechanism) 70 is provided between the intake camshaft 13 and the timing pulley 17. This mechanism causes the camshaft 13 and the timing pulley 17 to rotate relative to each other. That is, in the continuously variable valve timing mechanism 70, the camshaft 13 and the timing pulley 17 are formed as externally-toothed gears, and are linked together by a ring gear having a helical spline on the outer and inner circumferences thereof, and the relative rotation is achieved by moving the ring gear along its axial direction. The movement of the ring gear is accomplished by controlling the hydraulic pressure supplied from a hydraulic source, and an oil control valve (OCV) 110 is provided to control the hydraulic pressure.

Next, the details of the VVT mechanism 70 and OCV 110 will be described with reference to FIGS. 2 to 5. The intake camshaft 13 is rotatably supported with its journal 71 between the cylinder head 3 and a bearing cap 72. On the outer circumference of the camshaft 13, and near the forward portion of the journal 71 (leftward in FIGS. 2 and 4), is mounted the timing pulley 17 in relatively rotatable fashion. The timing pulley 17 has a large number of external teeth 73 on its outer circumference, around which the timing belt 20 is passed. As described earlier, the rotational motion of the crankshaft 7 is transmitted to the timing pulley 17 by means of the timing belt 20.

Figure 2:
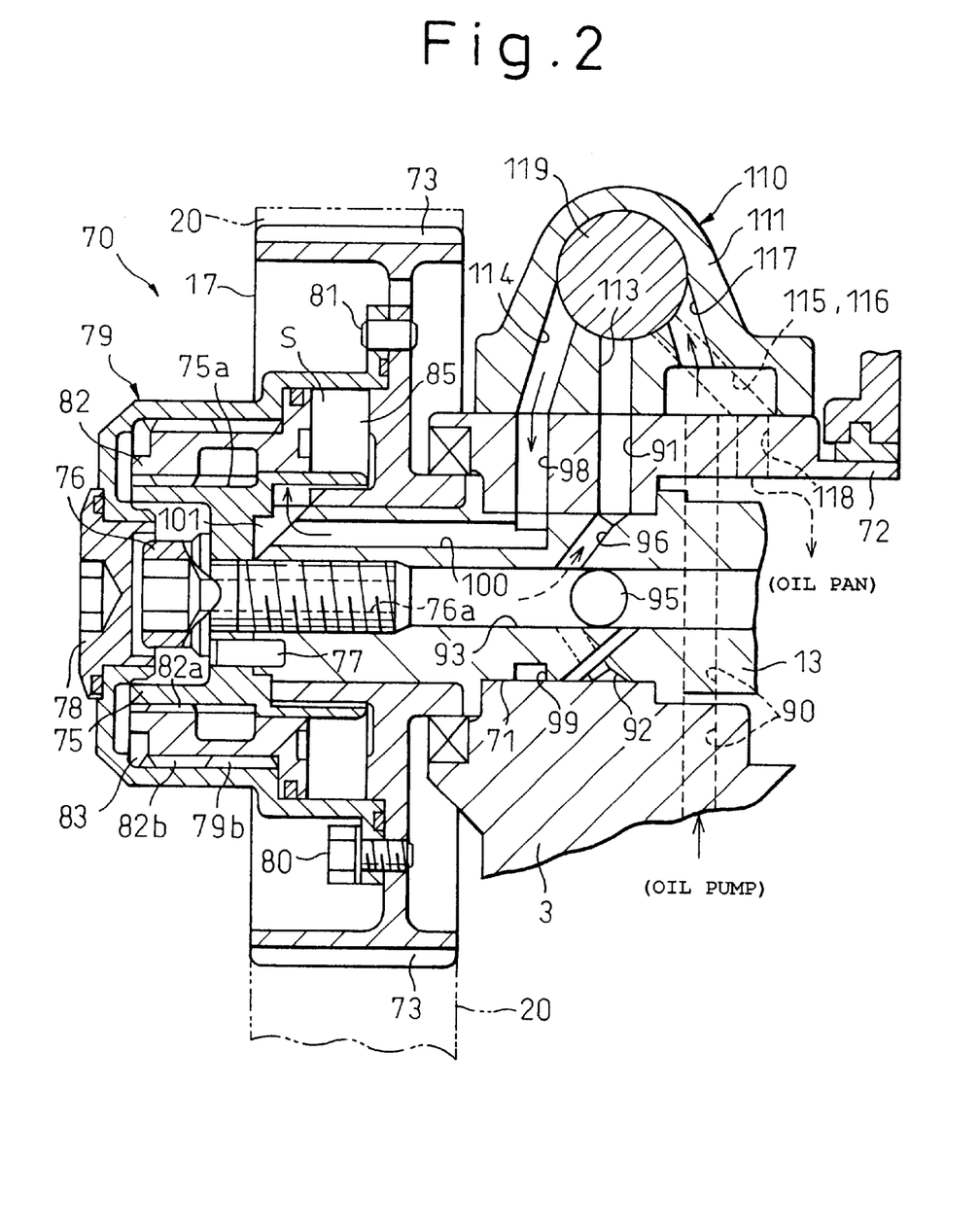
FIG. 2 is a partially cross-sectional view showing a VVT mechanism when the VVT mechanism is operated so as to achieve the most retarded intake valve timing.
Figure 4:
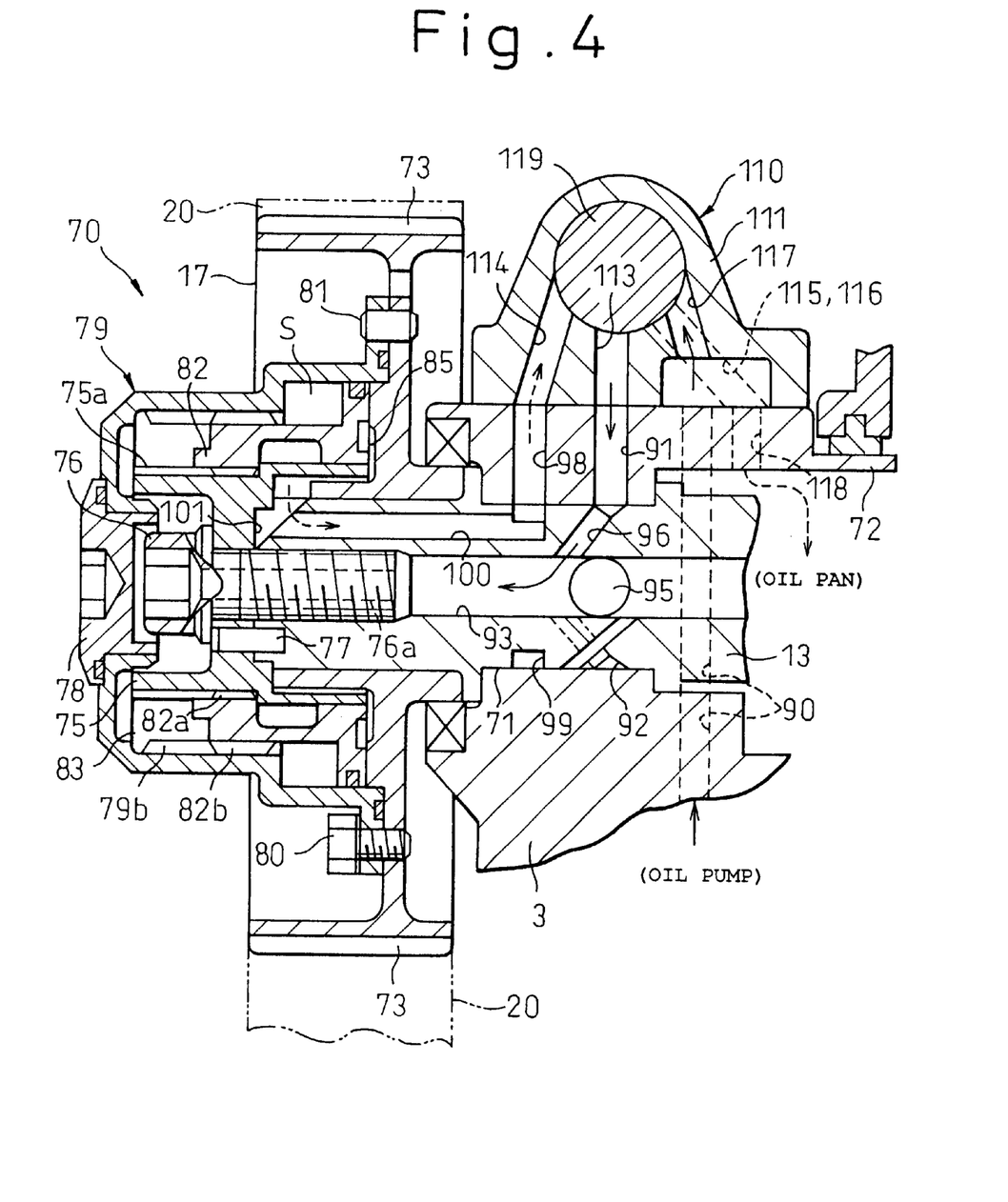
FIG. 4 is a partially cross-sectional view showing the VVT mechanism when the VVT mechanism is operated so as to achieve the most advanced intake valve timing.

An inner cap 75 is attached to the forward end of the camshaft 13 with a hollow bolt 76 and a pin 77 in such a manner as to be rotatable with the camshaft 13. A cover 79 having a lid 78 is attached to the timing pulley 17 with a bolt 80 and a pin 81 in such a manner as to be rotatable with the timing pulley 81. The forward end of the camshaft 13 and the entire structure of the inner cap 75 are shrouded by the cover 79.

The timing pulley 17 and the camshaft 13 are connected via the ring gear 82 interposed between the cover 79 and the inner cap 75. The ring gear 82 is substantially annular in shape, and is mounted movably, backward and forward in reciprocating fashion, in a space S enclosed by the timing pulley 17, the cover 79, and the inner cap 75. A large number of teeth 82a and 82b are formed on the inner and outer circumferences of the ring gear 82. To correspond to these teeth, a large number of teeth 75a and 79b are formed on the outer circumference of the inner cap 75 and the inner circumference of the cover 79, respectively. These teeth 82a, 82b, 75a, and 79b are all helical teeth whose traces cross the axis of the shaft 13. The teeth 75a and 82a engage with each other, and the teeth 79b and 82b engage with each other. With the respective teeth engaging with each other, the rotational motion of the timing pulley 17 is transmitted via the cover 79, the ring gear 82, and the inner cap 75 to the camshaft 13. Further, since the teeth 82a, 82b, 75a, and 79b are helical teeth, when the ring gear 82 moves in the forward or backward direction, torsional forces are applied to the inner cap 75 and the cover 79, causing the camshaft 13 to rotate relative to the timing pulley 17.

Figure 3:
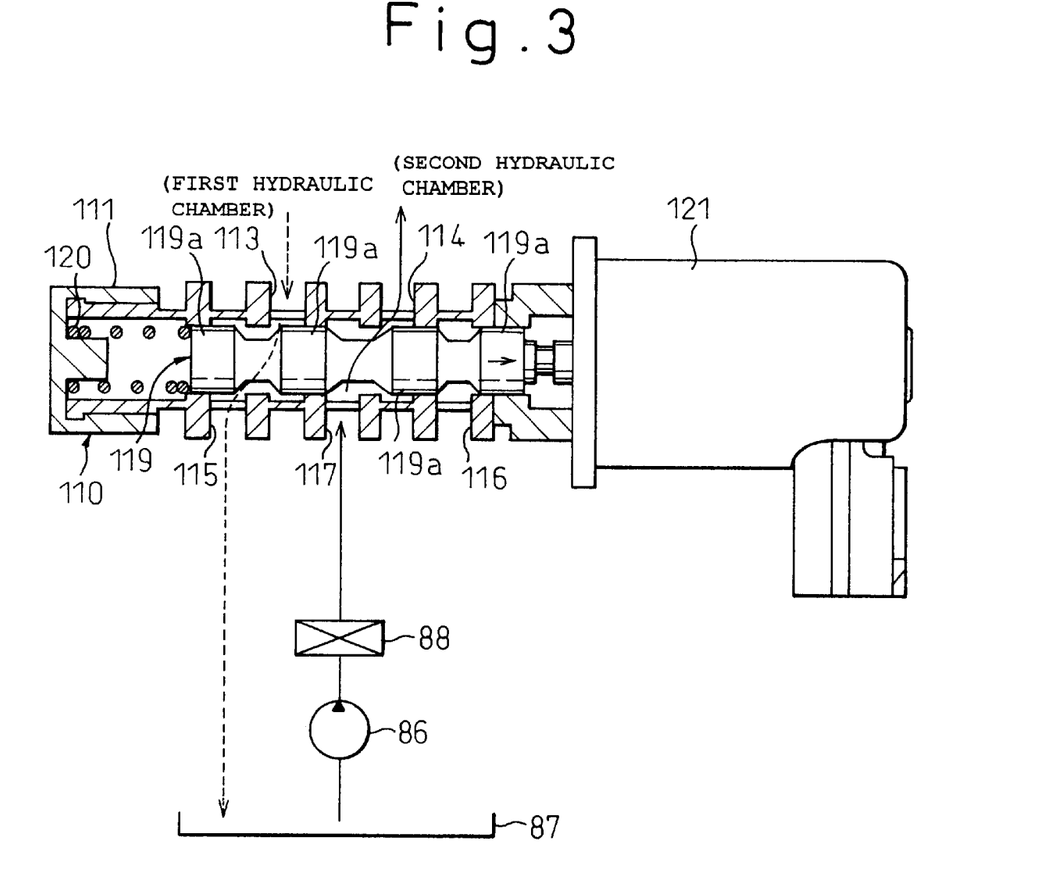
FIG. 3 is a partially cross-sectional view showing an oil control valve (OCV) when the OCV is controlled so as to achieve the most retarded intake valve timing.
Figure 5:
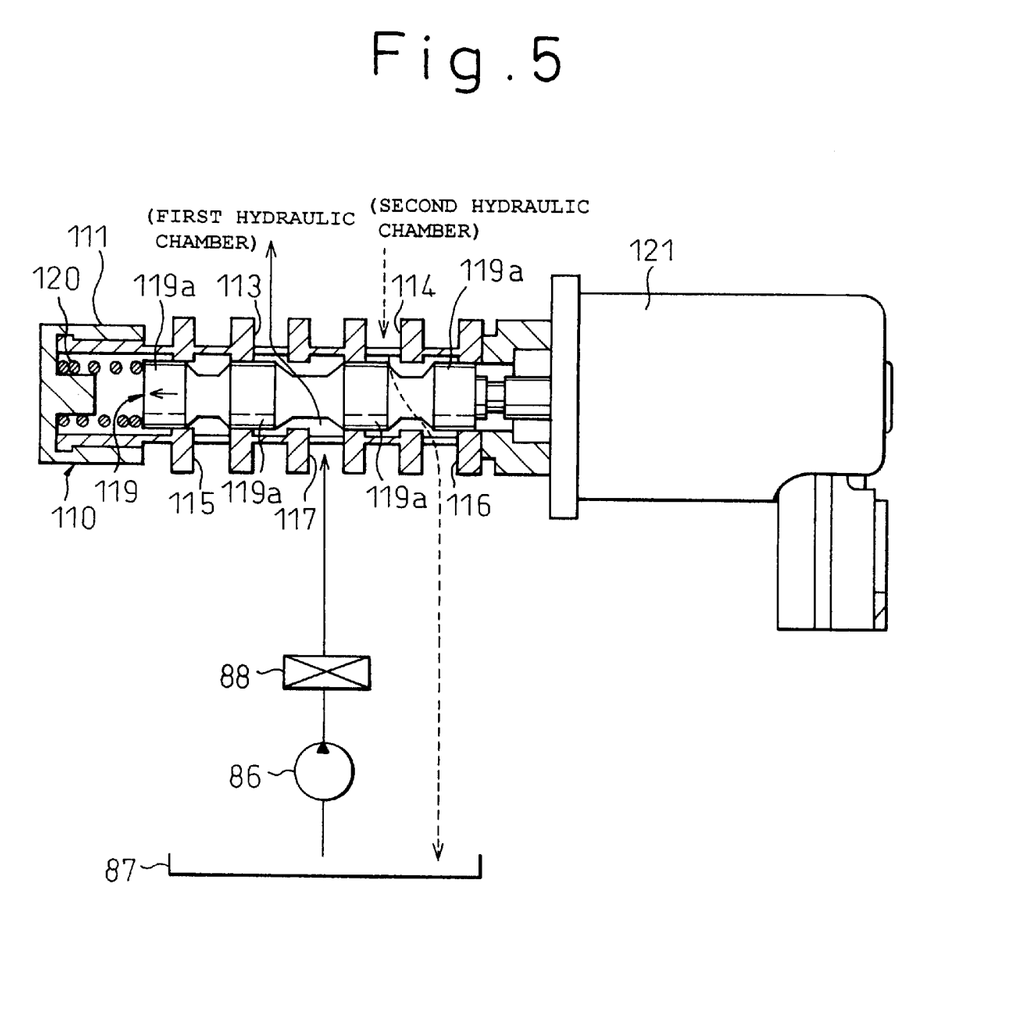
FIG. 5 is a partially cross-sectional view showing the oil control valve (OCV) when the OCV is controlled so as to achieve the most advanced intake valve timing.

In the space S, a first hydraulic chamber 83 is formed on the front side of the ring gear 82, and a second hydraulic chamber 85 on the rear side. The oil pump 86 installed in the engine 1 is utilized to supply the hydraulic pressure of lubricating oil to the hydraulic chambers 83 and 85, as shown in FIGS. 3 and 5. The oil pump 86 is linked to the crankshaft 7 so that it is driven by the crankshaft 7 to draw and circulate lubricating oil from an oil pan 87 when the engine 1 is operating. Foreign particles, metal powder, etc. contained in the circulating oil are removed by an oil filter 88. The hydraulic pressure of the lubricating oil passed through the oil filter 88 is supplied to the hydraulic chambers 83 and 85.

As shown in FIGS. 2 and 4, the oil pump 86 is connected with the first hydraulic chamber 83 through a first supply passage which will be described below. That is, a vertically extending head oil passage 90 is formed in the cylinder head 3 and the bearing cap 72. In the bearing cap 72, an oil hole 91 is formed running parallel to the head oil passage 90. A journal groove 92 is formed around the entire circumference of the journal 71 of the camshaft 13 in the position thereof corresponding to the oil hole 91.

In the camshaft 13 is formed a shaft oil passage 93 extending along the axis thereof. The shaft oil passage 93 is divided into front and rear sections by a ball 95 placed at an intermediate point along it. An oil hole 96 connecting between the journal groove 92 and the shaft oil passage 93 is formed through the camshaft 13. The front side of the shaft oil passage 93 is connected with the first oil chamber 83 through a center hole 76a of the hollow bolt 76. The head oil passage 90, the oil hole 91, the journal groove 92, the oil hole 96, the shaft oil passage 93, and the center hole 76a together form the first supply passage.

The oil pump 86 is connected with the second hydraulic chamber 85 through a second supply passage which will be described below. That is, an oil hole 98 running parallel to the oil hole 91 is formed in the bearing cap 72. A journal groove 99 is formed around the entire circumference of the journal 71 of the camshaft 13 in the position thereof corresponding to the oil hole 98. In the camshaft 13 is formed a shaft oil passage 100 extending parallel to the shaft oil passage 93. The rear end of the shaft oil passage 100 is connected with the journal groove 99, and the front end is connected with the second hydraulic chamber 85 through an oil hole 101 formed between the camshaft 13 and the inner cap 75. The head oil passage 90, the oil hole 98, the journal groove 99, the shaft oil passage 100, and the oil hole 101 together form the second supply passage.

The oil control valve (OCV) 110 constructed from an electromagnetic linear solenoid valve for adjusting the magnitude of the hydraulic pressure supplied to the hydraulic chambers 83 and 85 is mounted at an intermediate point along the first and second supply passages.

As shown in FIGS. 2 and 3, a casing 111 of the OCV 110 is provided with a first port 113, a second port 114, a third port 115, a fourth port 116, and a fifth port 117 for communicating between the interior and exterior of the OCV 110. The first port 113 is connected with the oil hole 91, while the second port 114 is connected with the oil hole 98. The third and fourth ports 115 and 116 are connected with the oil pan 87 through an oil hole 118 formed in the bearing cap 72. The fifth port 117 is connected with the oil pump 86 via the head oil passage 90, the oil filter 88, etc.

A spool 119 having four cylindrical valve bodies 119a is housed inside the casing 111 in such as manner as to be movable in reciprocating fashion. The spool 119 is moved along the axial direction by the action of a spring 120 and an electromagnetic solenoid 121 installed at both ends (at the left and right of FIG. 3) of the spool 119.

For example, as shown in FIG. 5, when the spool 119 is moved forward (leftward in the figure), the fifth port 117 becomes connected with the first port 113, and the second port 114 becomes connected with the fourth port 116. With these connections, the hydraulic pressure supplied through the head oil passage 90 is transmitted from the OCV 110 to the first hydraulic chamber 83 via the oil hole 91, the journal groove 92, the oil hole 96, the shaft oil passage 93, and the center hole 76a. When this hydraulic pressure is applied to the ring gear 82 from the front side thereof, the ring gear 82 is rotationally moved backward against the pressure of the lubricating oil in the second chamber 85. This rotational movement applies torsional force to the inner cap 75 and the cover 79.

As a result, the angle of rotation of the camshaft 13 relative to the timing pulley 17 changes, causing the valve timing of the intake valve 11 to advance. That is, the valve open timing of the intake valve 11 is advanced. The backward movement of the ring gear 82 is limited at the position where it contacts the timing pulley 17. At the position where the ring gear 82 stops by contacting the timing pulley 17, the valve open timing of the intake valve 11 is most advanced.

On the other hand, when the spool 119 in the OCV 100 is moved backward (rightward in the figure), as shown in FIG. 3, the fifth port 117 becomes connected with the second port 114, and the first port 113 becomes connected with the third port 115. Thereupon, the hydraulic pressure supplied through the head oil passage 90 is transmitted from the OCV 110 to the second hydraulic chamber 85 via the oil hole 98, the journal groove 99, the shaft oil passage 100, and the oil hole 101. When this hydraulic pressure is applied to the ring gear 82 from the rear side thereof, the ring gear 82 is rotationally moved forward against the pressure of the lubricating oil in the first chamber 83. This rotational movement applies torsional force to the inner cap 75 and the cover 79.

As a result, the angle of rotation of the camshaft 13 relative to the timing pulley 17 changes, causing the valve timing of the intake valve 11 to retard. That is, the valve open timing of the intake valve 11 is retarded. The forward movement of the ring gear 82 is limited at the position where it contacts the cover 79. At the position where the ring gear 82 stops by contacting the cover 79, the valve open timing of the intake valve 11, that is, the valve timing, is most retarded.

The VVT mechanism 70 is constructed as described above. By driving the VVT mechanism 70, the valve timing of the intake valve 11 can be varied as desired within a predetermined range.

As shown in FIG. 1, the engine 1 is equipped with various kinds of sensors as described hereinafter. A coolant temperature sensor 144 for detecting coolant temperature of the engine 1 is mounted in the cylinder block 2. A hot-wire air flow meter 140 for detecting the amount of flowing air (mass f low rate $G_a$) is mounted in the intake passage 30. In the intake passage 30, an intake air temperature sensor 143 for detecting intake air temperature is mounted near the air cleaner 31. Near the throttle valve 32 in the intake passage 30 is mounted a throttle angle sensor 142 for detecting the angular position (throttle angle TA) of its shaft 32a. There is also provided an idle switch 152 which, when the throttle valve 32 reaches its fully closed position, is turned on and sets its output, a throttle full-close signal, active. An intake air pressure sensor 141 for detecting the internal pressure (intake air pressure PM) of the surge tank 33 is mounted in the surge tank 33. An $O_2$ sensor 145 for detecting, based on residual oxygen concentration in the exhaust gas, whether the air-fuel ratio is lean or rich with respect to the stoichiometric air-fuel ratio, is mounted at an intermediate point along the exhaust passage 60.

The distributor 53 contains two rotors which rotate in synchronism with the rotation of the crankshaft 7. The distributor 53 is provided with a crankshaft reference position sensor 150 which, based on the rotation of one rotor, generates a reference position detection pulse for every 720° CA rotation, measured in degrees of crankshaft angle (CA), for detection of the reference position of the crankshaft 7, and a rotational speed sensor 151 which, based on the rotation of the other rotor, generates a rotational speed detection pulse for every 30° CA for detection of the rotational speed of the crankshaft 7 (engine speed NE). The vehicle is also mounted with a vehicle speed sensor 153 which produces output pulses representing the actual vehicle speed.

Further, a crankshaft angle sensor 154 comprising an electromagnetic pickup and a rotor on the crankshaft 7 is mounted in the engine 1. The rotor is constructed from a magnetic member, around the outer circumference of which are formed a plurality of teeth uniformly spaced from one another by a predetermined angle. The electromagnetic pickup generates a crankshaft angle signal pulse as the rotor rotates with the rotation of the crankshaft 7 and each tooth passes in front of the electromagnetic pickup. The rotation angle (crankshaft angle) of the crankshaft 7 can be detected by measuring the number of crankshaft angle signal pulses that have been output from the crankshaft angle sensor 154 since the generation of the crankshaft reference position signal by the crankshaft reference position sensor 150.

The engine 1 is also provided with a camshaft angle sensor 155. The camshaft angle sensor 155 comprises an electromagnetic pickup and a rotor on the intake camshaft 13. The rotor is constructed from a magnetic member, around the outer circumference of which are formed a plurality of teeth uniformly spaced from one another by a predetermined angle. The electromagnetic pickup generates a camshaft angle signal pulse as the rotor rotates with the rotation of the camshaft 13 and each tooth passes in front of the electromagnetic pickup. The actual valve timing of the intake valve 11 can be detected by computing the phase difference between the rotation of the camshaft 13 and the rotation of the crankshaft 7 based on the camshaft angle signal and the crankshaft angle signal.

The engine electronic control unit (engine ECU) 170 shown in FIG. 1 is a microcomputer system that performs fuel injection control, ignition timing control, idle speed control, valve timing control, etc. The hardware configuration is shown in the block diagram of FIG. 6. Signals from the various sensors and switches are input via an A/D conversion circuit (ADC) 175 or via an input interface circuit 176 to a central processing unit (CPU) 171; using the input signals, the CPU 171 performs arithmetic operations in accordance with programs and various maps stored in a read-only memory (ROM) 173 and, based on the results of the operations, outputs control signals for the various actuators via respective drive control circuits 177a–177d. A random-access memory (RAM) 174 is used to temporarily store data during the arithmetic operation and control processes. A backup RAM 179 is supplied with power from a battery (not shown) directly connected to it, and is used to store data (such as various learning values) that should be retained when the ignition switch is off. These constituent elements of the ECU are interconnected by a system bus 172 consisting of an address bus, a data bus, and a control bus.

Figure 6:
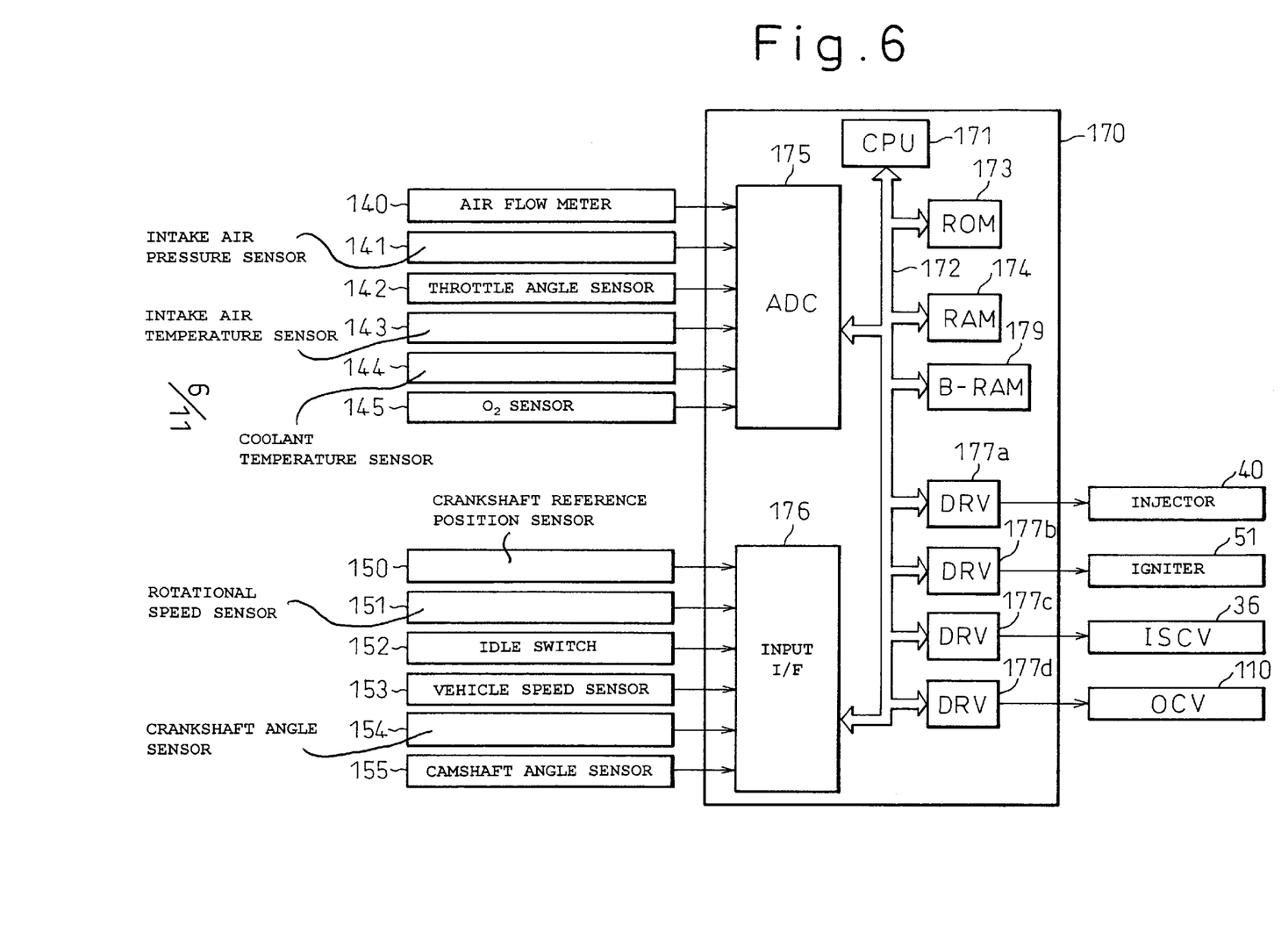
FIG. 6 is a block diagram showing the hardware configuration of an engine ECU according to one embodiment of the present invention.

The fuel injection control basically involves computing the fuel injection amount, that is, the injection time of the injector 40, that achieves the desired target air-fuel ratio on the basis of the intake air mass per engine revolution, and controlling the injector 40 via the drive control circuit 177a so that the fuel is injected at the time instant that the prescribed crankshaft angle is reached. Here, the intake air mass per engine revolution is computed, basically, from the mass flow rate of intake air measured by the hot-wire air flow meter 140 and the engine speed obtained from the rotational speed sensor 151. In the above fuel injection amount computation, corrections are applied, such as basic corrections based on signals from the throttle angle sensor 142, the intake air temperature sensor 143, the coolant temperature sensor 144, etc., an air-fuel ratio feedback correction based on a signal from the $O_2$ sensor 145, and an air-fuel ratio learning correction to bring the median of the feedback correction value to stoichiometry.

The ignition timing control is performed by sending an ignition signal to the igniter 51 via the drive control circuit 177b after determining optimum ignition timing by comprehensively judging the engine condition based on the engine speed obtained from the rotational speed sensor 151 and on signals from other sensors.

In the idle speed control, an idle state is detected based on the throttle full-close signal from the idle switch 152 and the vehicle speed signal from the vehicle speed sensor 153, and the actual engine speed is compared with the target engine speed determined by such factors as the engine coolant temperature from the coolant temperature sensor 144; then, based on the resulting error, the amount of control necessary to achieve the target engine speed is determined, and the amount of air is adjusted by controlling the ISCV 36 via the drive control circuit 177c, thereby maintaining an optimum idle speed.

The valve timing control involves setting the target valve timing (valve open/close timing) of the intake valve 11 according to the driving condition and controlling the continuously variable valve timing mechanism 70 based on the thus set valve timing. More specifically, based on the signals from the crankshaft angle sensor 154 and the camshaft angle sensor 155, feedback control is applied to the oil control valve 110 so that the intake camshaft 13 rotates by maintaining a prescribed phase difference relative to the crankshaft 7, that is, the camshaft 13 is rotated by a prescribed angle relative to the timing pulley 17.

Figure 7:
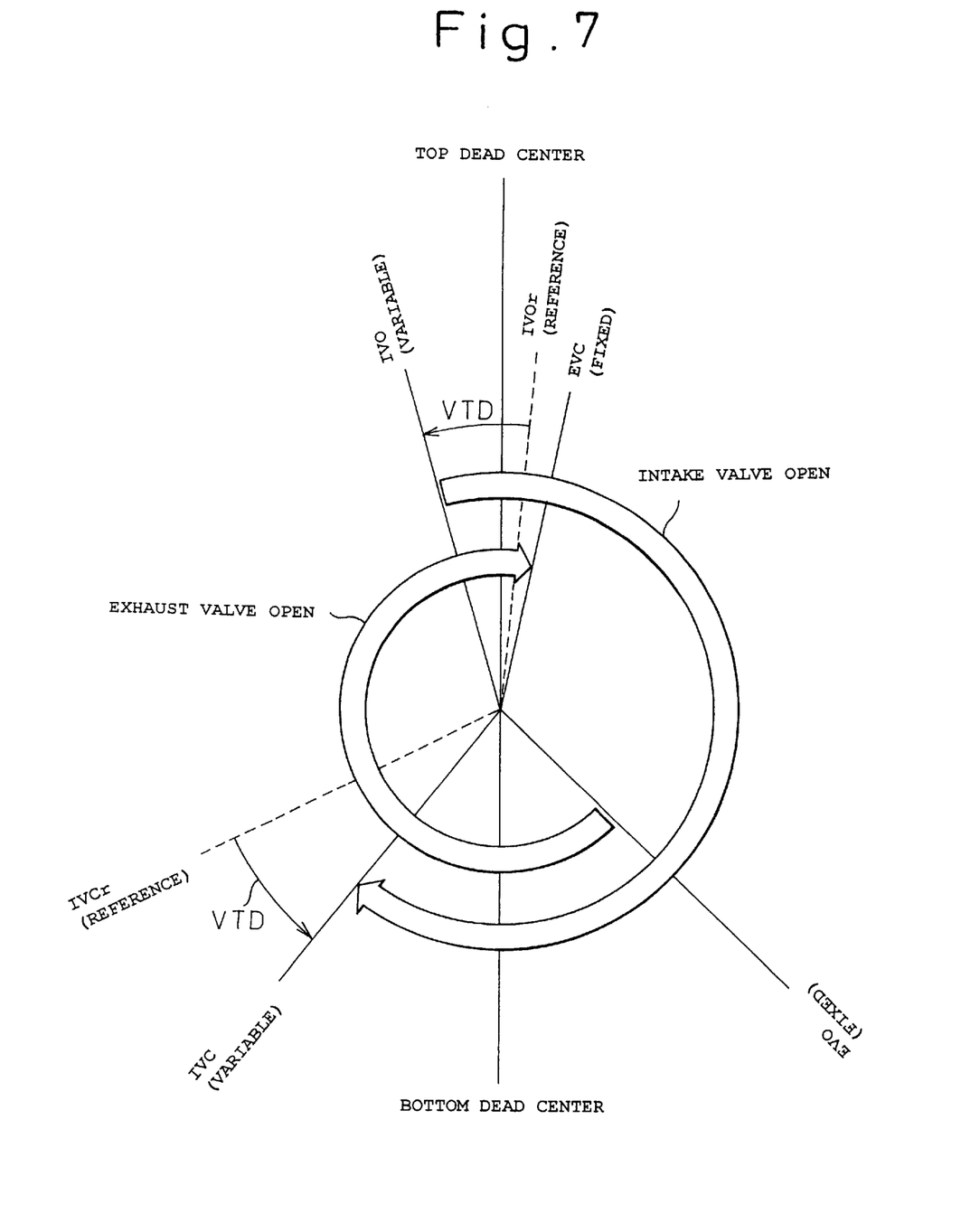
FIG. 7 is a valve timing diagram showing the open/close timings of an intake valve and an exhaust valve as expressed in degrees of crankshaft rotation.

FIG. 7 is a valve timing diagram showing the open/close timings of the intake valve 11 and exhaust valve 12 as expressed in degrees of crankshaft rotation. As shown in the diagram, the exhaust valve 12 is opened at a fixed valve open timing EVO (in this embodiment, 50° before exhaust bottom dead center) and closed at a fixed valve close timing EVC (in this embodiment, 3° after exhaust top dead center). As for the intake valve 11, the length of the valve open period is fixed, but the valve opening timing IVO and valve close timing IVC can be varied and can both be displaced by a desired amount in the advancing direction from their respective reference positions representing the most retarded open/close timings (IVOr and IVCr in the figure). However, the maximum amount of valve timing displacement, VTD, is 60° in this embodiment. The amount of valve timing displacement, VTD, from the reference position corresponds to the amount of control. In this embodiment, the reference valve open timing IVOr as the reference position is at 3° after exhaust top dead center, and the reference valve close timing IVCr is at 65° after intake bottom dead center. Therefore, in this case, when the valve timing displacement amount VTD is 30° CA (crankshaft angle), for example, IVO is 27° before exhaust top dead center and IVC is at 35° after intake bottom dead center. In this embodiment, since the reference valve open timing IVOr of the intake valve 11 and the valve close timing EVC of the exhaust valve 26 are both at 3° after exhaust top dead center, the amount of valve timing displacement, VTD, coincides with the amount of valve overlap. However, in FIG. 7, considering generalization and for ease of understanding, IVOr and EVC are shown as not coinciding with each other.

Here, when computing the amount of engine intake air that becomes necessary for fuel injection control, etc. based on the amount of flowing air measured by the air flow meter 140, smoothing must be applied by considering transient conditions, as previously described. In an internal combustion engine equipped with a VVT mechanism 70 as in the present embodiment, since the volumetric efficiency varies during the operation of the mechanism, the amount of engine intake air cannot be calculated accurately if the smoothing operation is performed using a fixed smoothing factor.

Figure 8:
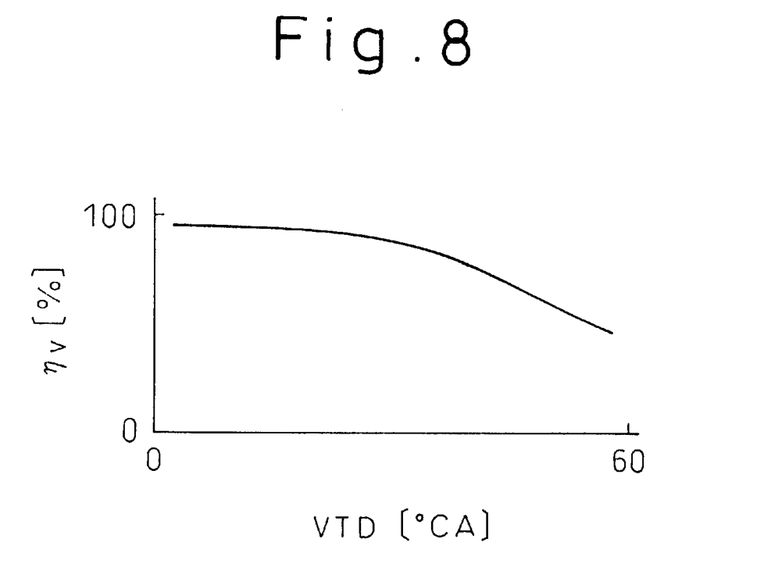
FIG. 8 is a characteristic diagram illustrating the relationship between the amount of valve timing displacement (the amount of advance relative to a reference position), VTD, and the volumetric efficiency $\eta_v$.
Figure 9:
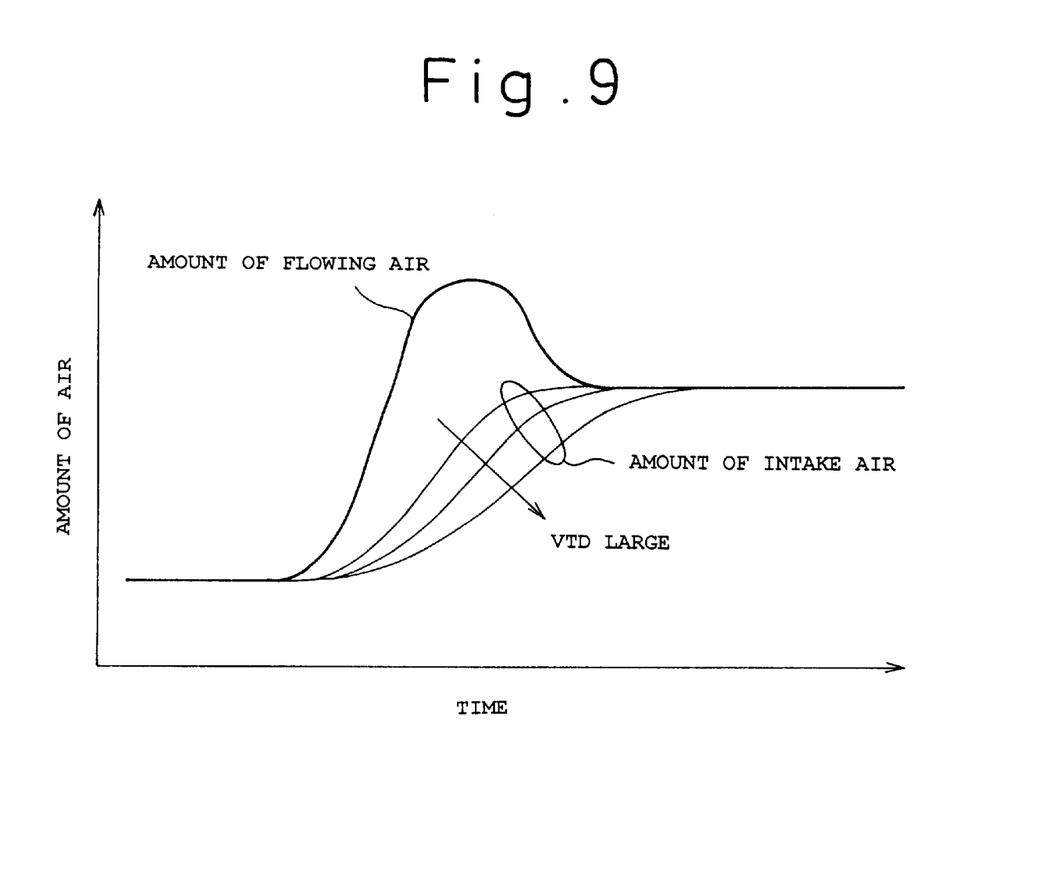
FIG. 9 is a diagram showing how the amount of air flowing past an air flow meter and the amount of intake air actually drawn into an engine change with time in an accelerating condition.

FIG. 8 is a characteristic diagram illustrating the relationship between the amount of valve timing displacement (the amount of advance relative to the reference position), VTD, and the volumetric efficiency $\eta_v$ under a given set of driving conditions. As shown in the diagram, the volumetric efficiency $\eta_v$ decreases as VTD increases, that is, as the valve timing is advanced. As a result, the amount of air flowing past the air flow meter and the amount of intake air actually drawn into the engine, in an accelerating condition, change with time as shown in FIG. 9. More specifically, the amount of engine intake air changes differently over time according to the amount of valve timing displacement, VTD, that is, the change in the amount of engine intake air becomes less steep as VTD increases. In view of this, in a first embodiment of the invention, the smoothing factor used for the computation of the intake air amount is varied according to the valve timing displacement amount VTD.

Figure 10:
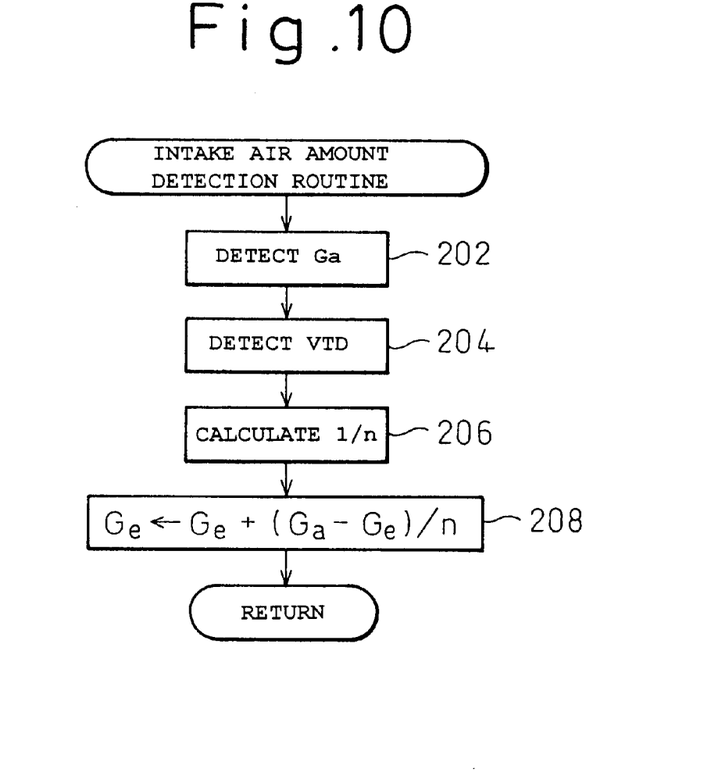
FIG. 10 is a flowchart illustrating a processing sequence for an intake air amount detection routine according to a first embodiment of the present invention.
Figure 11:
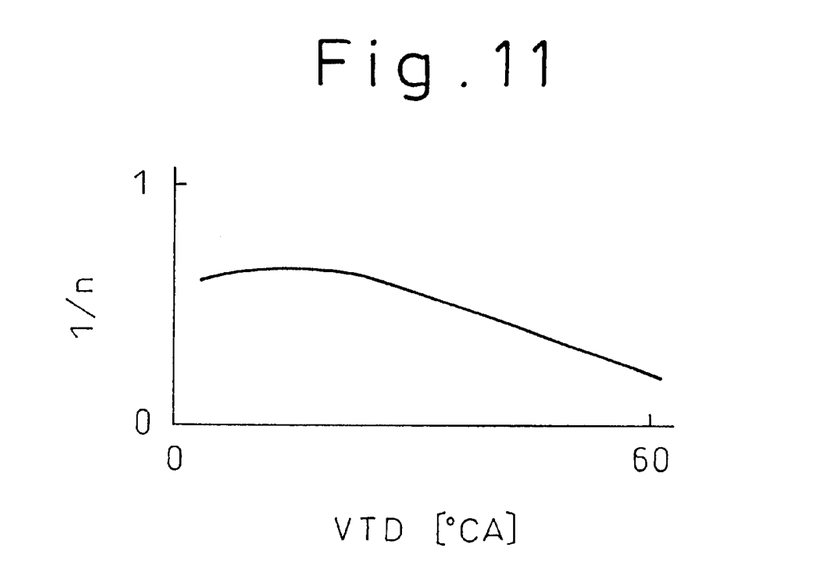
FIG. 11 is a diagram showing a map used when computing a smoothing factor "1/n" according to the valve timing displacement amount VTD.

FIG. 10 is a flowchart illustrating a processing sequence for an intake air amount detection routine which is executed by the CPU 171 at predetermined intervals of time in accordance with the first embodiment of the invention. FIG. 11 shows a map which is referred to in this routine when computing the smoothing factor "1/n" according to the valve timing displacement amount VTD. First, in step 202, the current amount of flowing air Ga (mass flow rate) is detected based on the output of the hot-wire air flow meter 140. Next, in step 204, the actual valve timing of the intake valve 11, that is, the valve timing displacement amount VTD, is detected based on the outputs of the crankshaft angle sensor 154 and camshaft angle sensor 155.

Next, in step 206, the smoothing factor "1/n" appropriate to the valve timing displacement VTD is obtained through interpolation based on the map of FIG. 11. This map is set so that the degree of smoothing increases, that is, the smoothing factor "1/n" is reduced as the volumetric efficiency $\eta_v$ decreases according to the valve timing. In the final step 208, engine intake air amount Ge (mass per unit time) is updated by the smoothing operation using the equation $$G_e \leftarrow G_e + (G_a - G_e)/n = \{(n-1)G_e + G_a\}/n$$

The above equation means weighting the previously computed intake air amount $G_e$ (smoothed value) by "n−1" and the currently measured flowing air amount $G_a$ by 1, taking the average of them, and setting the result as the current intake air amount $G_e$.

In actuality, however, the volumetric efficiency $\eta_v$ changes depending on the driving condition even when the valve timing is the same. In a second embodiment, therefore, when determining the smoothing factor, the volumetric efficiency $\eta_v$ is computed based not only on the amount of valve timing displacement, VTD, but also on the throttle angle TA (as a value representing the engine load) and engine speed NE, and the smoothing factor is calculated based on the thus computed volumetric efficiency.

Figure 12:
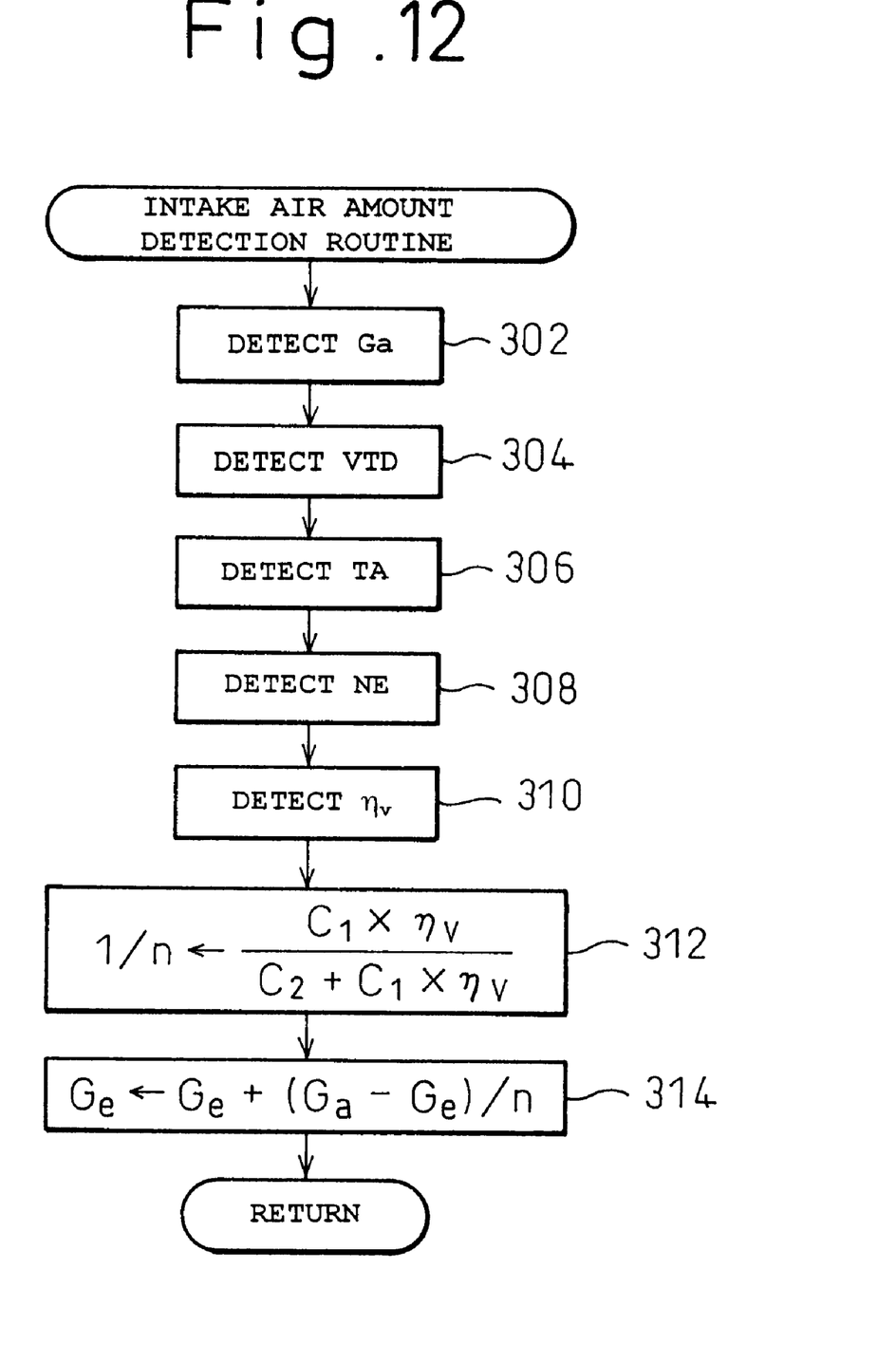
FIG. 12 is a flowchart illustrating a processing sequence for an intake air amount detection routine according to a second embodiment of the present invention.
Figure 13A:
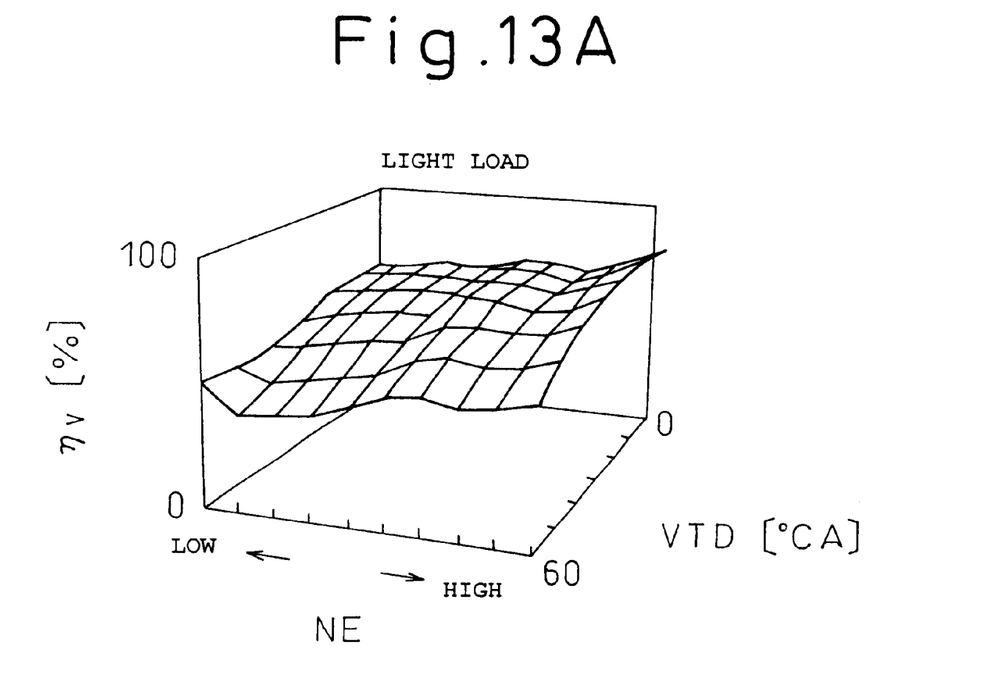
FIGS. 13A and 13B are maps used when obtaining volumetric efficiency $\eta_v$ based on engine speed NE and valve timing displacement amount VTD, the map of FIG. 13A being set for a light load condition and the map of FIG. 13B for a heavy load condition.
Figure 13B:
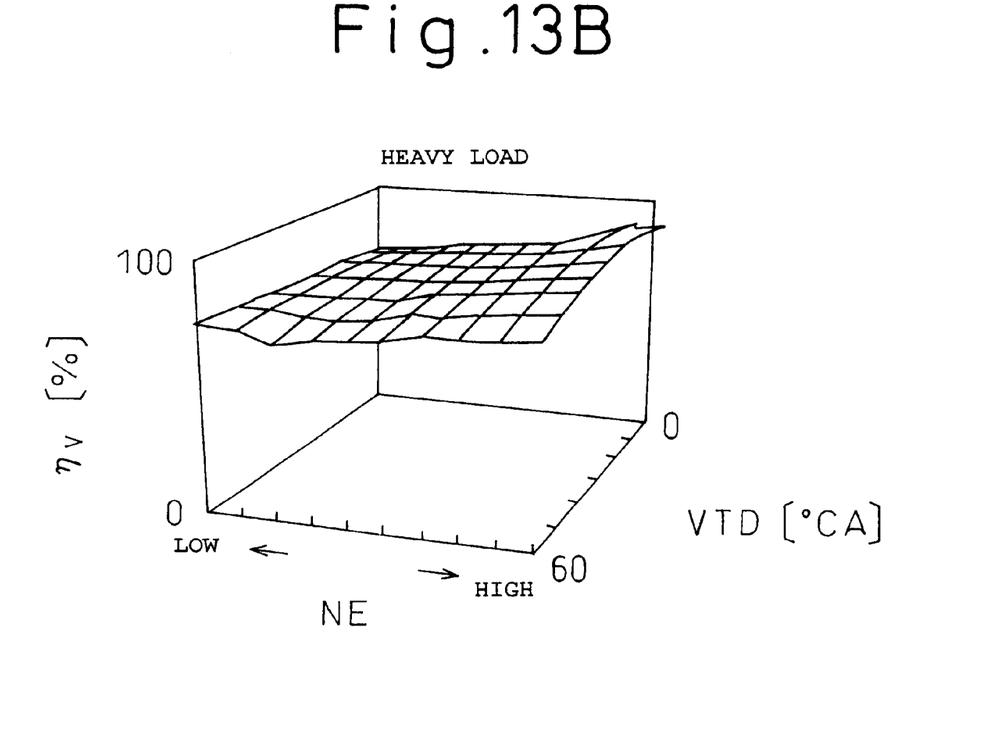

FIG. 12 is a flowchart illustrating a processing sequence for an intake air amount detection routine according to the second embodiment of the invention. FIGS. 13A and 13B are maps which are referred to in this routine; more specifically, these maps, which are used to obtain the volumetric efficiency $\eta_v$ based on the engine speed NE and the valve timing displacement amount VTD, are set for a particular light load condition and a particular heavy load condition, respectively. First, in steps 302 and 304, as in the previously described steps 202 and 204, the current amount of flowing air, $G_a$, and the amount of valve timing displacement, VTD, respectively, are detected.

Next, in step 306, based on the output of the throttle angle sensor 142, the current throttle angle TA is detected as the engine load. Here, as the engine load, the intake air pressure PM detected by the intake air pressure sensor 141 may be used instead. Next, in step 308, the engine speed NE is detected based on the output of the rotational speed sensor 151. Then, in step 310, the volumetric efficiency $\eta_v$ appropriate to the engine speed NE, valve timing displacement amount VTD, and throttle angle TA is computed through interpolation based on the maps of FIGS. 13A and 13B.

Next, in step 312, the smoothing factor "1/n" is calculated using the equation $$1/n \leftarrow (C_1 \times \eta_v)/(C_2 + C_1 \times \eta_v)$$

where $C_1$: constant determined by intake shape $C_2$: constant determined by engine displacement This equation is theoretically obtained from a state equation for a gas in the intake manifold. In the final step 314, as in the previously described step 208, the engine intake air amount $G_e$ is updated by the smoothing operation based on the above smoothing factor "1/n".

While the present invention has been described with respect to specific embodiments, it will be appreciated that the invention is not limited to the embodiments disclosed herein, but various other embodiments can also be devised. For example, though each of the above embodiments has dealt with an example in which the invention is applied to an internal combustion engine equipped with a variable valve mechanism for continuously varying camshaft phase by using a ring gear having a helical spline, it will be recognized that the invention is equally applicable to an internal combustion engine equipped with a two-step control (ON/OFF control) type variable valve mechanism. The invention can also be applied to an internal combustion engine equipped with a variable valve mechanism for continuously varying camshaft phase by using a vane as a driving member. Furthermore, the invention is applicable to an internal combustion engine equipped with a variable valve mechanism that uses a three-dimensional cam or a cam switching type variable valve mechanism which switches operation between a plurality of cams having different cam profiles for different valve opening characteristics.

Further, each of the above embodiments has been described as using a hot-wire air flow meter as a means for measuring the amount of air flowing through the intake passage, but instead, a Karman vortex air flow meter or a vane type air flow meter may be used.

In each of the above embodiments, the intake valve whose valve opening characteristic is varied by a variable valve mechanism has been taken as an example of the intake air control valve that controls the flow of intake air into the combustion chamber, but the invention is also applicable to an internal combustion engine equipped with a swirl control valve or a control valve that varies the area or length of the intake passage. Such valves are mounted near the intake port and are used to change the flow rate or flow direction by varying their angular position, and in this case also, the volumetric efficiency changes depending on their operating conditions, as in the case of a variable valve mechanism.

As described above, according to the present invention, in an internal combustion engine equipped with a variable intake air control mechanism capable of varying the operating condition of an intake air control valve that controls the flow of intake air into a combustion chamber, it becomes possible to accurately detect the amount of engine intake air based on the amount of air flowing as measured by an air flow meter; as a result, the accuracy of air/fuel ratio control improves, and this also contributes to preventing air pollution.

What is claimed is:

1. An apparatus for detecting the amount of intake air in an internal combustion engine having an intake passage, a throttle valve installed in said intake passage for controlling the amount of intake air, and a variable intake air control mechanism capable of varying the operating condition of an intake air control valve that controls the flow of intake air into a combustion chamber, said intake air amount detection apparatus comprising:

flowing air amount measuring means for measuring the flow rate of air flowing through said intake passage;

volumetric efficiency computing means for computing volumetric efficiency;

smoothing factor computing means for computing a smoothing factor based on the volumetric efficiency computed by said volumetric efficiency computing means; and intake air amount computing means for computing the amount of engine intake air by smoothing the flow rate measured by said flowing air amount measuring means based on said smoothing factor computed by said smoothing factor computing means.

2. An intake air amount detection apparatus for an internal combustion engine as claimed in claim 1, for an internal combustion engine as claimed in claim 1, wherein said volumetric efficiency computing means computes the volumetric efficiency based on the operating condition of said intake air control valve, engine load and engine speed.

3. An intake air amount detection apparatus for an internal combustion engine as claimed in claim 1, wherein said variable intake air control mechanism is a variable valve mechanism that utilizes an intake valve or an exhaust valve as said intake air control valve and varies the open condition of said valve.

4. An intake air amount detection apparatus for an internal combustion engine as claimed in claim 3, wherein said variable valve mechanism varies intake valve timing by continuously varying the phase of rotation of an intake camshaft relative to a crankshaft within a predetermined angle range.

5. An intake air amount detection apparatus for an internal combustion engine as claimed in claim 3, wherein said variable valve mechanism is a cam switching type mechanism which switches operation between a plurality of cams having different valve opening characteristics.

6. An intake air amount detection apparatus for an internal combustion engine as claimed in claim 1, wherein said smoothing factor computing means computes the smoothing factor $1/n$ based on the volumetric efficiency $\eta_v$, using an equation:

$$1/n \leftarrow (C_1 \times \eta_v)/(C_2 + C_1 \times \eta_v)$$

where $C_1$: constant determined by intake shape $C_2$: constant determined by engine displacement.

* * * * *